(12) United States Patent
Buscaglia et al.

(10) Patent No.: US 7,953,987 B2
(45) Date of Patent: May 31, 2011

(54) PROTECTION OF SECURE ELECTRONIC MODULES AGAINST ATTACKS

(75) Inventors: Carl U. Buscaglia, Clinton Corners, NY (US); Vincenzo Condorelli, Poughkeepsie, NY (US); Kevin C. Gotze, Poughkeepsie, NY (US); Nihad Hadzic, Wappingers Falls, NY (US); Donald W. Plass, Poughkeepsie, NY (US); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 11/682,349

(22) Filed: Mar. 6, 2007

(65) Prior Publication Data

US 2008/0222430 A1 Sep. 11, 2008

(51) Int. Cl.
*G06F 12/14* (2006.01)

(52) U.S. Cl. .................. 713/194; 713/192; 713/193

(58) Field of Classification Search .................. 713/192, 713/193, 194
See application file for complete search history.

(56) References Cited

U.S. PATENT DOCUMENTS

| | | | | |
|---|---|---|---|---|
| 5,337,290 | A * | 8/1994 | Ventimiglia et al. | 368/10 |
| 5,388,267 | A * | 2/1995 | Chan et al. | 713/2 |
| 5,394,367 | A * | 2/1995 | Downs et al. | 365/195 |
| 5,428,547 | A * | 6/1995 | Ikeda | 700/174 |
| 6,871,278 | B1 | 3/2005 | Sciupac | |
| 7,234,645 | B2 * | 6/2007 | Silverbrook et al. | 235/494 |
| 7,453,492 | B2 * | 11/2008 | Silverbrook | 348/207.2 |
| 7,483,053 | B2 * | 1/2009 | Silverbrook | 348/207.2 |
| 7,498,644 | B2 * | 3/2009 | Shapiro et al. | 257/428 |
| 2004/0183914 | A1 * | 9/2004 | Silverbrook | 348/207.2 |
| 2005/0195975 | A1 * | 9/2005 | Kawakita | 380/30 |
| 2006/0083328 | A1 * | 4/2006 | Green et al. | 375/295 |
| 2006/0123465 | A1 * | 6/2006 | Ziegler | 726/2 |
| 2006/0262928 | A1 * | 11/2006 | Bar-El et al. | 380/228 |
| 2008/0022874 | A1 * | 1/2008 | Silverbrook | 101/330 |
| 2008/0143519 | A1 * | 6/2008 | Piotrowski | 340/540 |

\* cited by examiner

*Primary Examiner* — Edan Orgad
*Assistant Examiner* — Bradley Holder
(74) *Attorney, Agent, or Firm* — William A. Kinnaman, Jr.

(57) ABSTRACT

A method and apparatus is disclosed for preventing the unintended retention of secret data caused by preferred state/burn-in in secure electronic modules. Sequentially storing the data and its inverse on alternating clock cycles, and by actively overwriting it to destroy it, prevents SRAM devices from developing a preferred state. By encrypting a relatively large amount of secret data with a master encryption key, and storing said master key in this non-preferred state storage, the electronic module conveniently extends this protection scheme to a large amount of data, without the overhead of investing or actively erasing the larger storage area.

20 Claims, 3 Drawing Sheets

PROTECTION OF SECURE ELECTRONIC MODULES AGAINST ATTACKS

FIELD OF THE INVENTION

This invention relates to physically secure cryptographic hardware modules, and particularly to tamper response methods to protect sensitive data stored within the module.

DESCRIPTION OF BACKGROUND

Systems that provide physical security of sensitive data such as cryptographic keys typically require enclosures that contain the circuitry that stores and processes the sensitive data. U.S. Pat. No. 4,860,351—'Tamper Resistance Packaging Protection of Information Stored in Electronic Circuitry' describes how such a secure enclosure is implemented and is hereby incorporated in its entirety herein. The tamper response to penetration of physical enclosures must remove sensitive data within a period of time that makes breach of the enclosure and data retrieval or data preservation in memory devices highly unlikely. SRAM memory technology is frequently used for memory applications that store sensitive data in security modules. SRAM data remains stored in the memory device as long as power is applied to the device (volatile memory) and the data is not purposely over written using write enable signals. This volatile memory device is used to store sensitive data in secure enclosures because the sensitive data in the entire memory can be destroyed in a relatively fast operation by removing power to the device when a tamper event occurs. The power to the SRAM memory is also backed up with a battery source as there is a requirement to retain certain security data in the security module when the security module is not powered by system power.

When the memory device or security module is subjected to low temperatures the electrical discharge (data destruction) of the memory cell upon power removal or grounding of the power supply takes longer. If some charge still remains on the memory cells when the device is repowered, the memory cells will come up in the same state as before the power was removed. In this ease data previously stored in the memory will be retained. Significant data retention time increases have been observed at lower temperatures but at temperatures still within environmental ranges.

Low temperature attacks try to take advantage of the increased data retention lime to breach the enclosure and repower the memory device before the memory data is destroyed from the tamper response (power removal to the memory device) caused by the enclosure breach.

Conversely, subjecting the memory device to higher voltage than the maximum specified operating voltage of the device for extended periods and/or subjecting the device to higher temperatures for long periods can cause preferential states to be 'burned into' the memory storage elements devices. In this scenario memory devices that store data that is not overwritten for long periods of time such as cryptographic keys, could reveal this long term data when first powered up before any initial write operations. Therefore the tamper response becomes ineffective because the removal of power to the memory device may not affect the preferred states within the memory device that will be revealed when powered up.

In light of the above, low temperature attacks that could increase retention time of data in memory technology and high temperature/high voltage attacks that could 'burn in' preferred states in memory must be considered in designing the security of the enclosure and enclosed hardware. To address these exposures, temperature and voltage min/max tamper limits can be used to invoke a tamper response if the enclosure and memory device are subjected to temperature extremes. However, temperature and voltage limit thresholds are difficult to determine based on technology retention/burn-in sensitivity. For example different memory technology from different memory suppliers may have longer or shorter retention time sensitivities to lower temperatures and as technology evolves sensitivities of retention time to lower temperatures may change. Such voltage and temperature setting limits also create handling (Electrostatic discharge), shipping, and product storage limitations. For Example, during shipment cargo holds in planes can reach sub 0 Farenheight temperatures and warehouse temperatures may reach well over 100 degrees F. Therefore, if in order to protect against data retention times temperature tamper limit needs to be higher or lower than the temperature the device is exposed to during shipment, special thermal provisions must be made for shipment of the security product. Additionally, with voltage tamper limits, care must be taken to insulate all parts of the security module from accidentally shorting the power distribution system of the module so that an accidental voltage tamper cannot occur due to handling of the security module under battery back up power.

Actively erasing memory using the write function or write enable of the memory provides a more reliable destruction of data than removing power and is not sensitive to the data retention problem. However, in a large memory typical of the sizes needed for the storage of secure data writing over every memory location to be sure all sensitive data is destroyed (active erasure) cannot be completed within the time constraint of a tamper response.

Continuously inverting the memory storage bit locations (changing a 2 state element from 1 state to the other) at a 50% duty cycle to prevent imprinting of a preferred state will prevent the 'data imprinting' or 'burn in' of the memory cells of the SRAM device, however, it is also difficult and time consuming to implement constant inverting of data in a large memory due to it's size, and the power consumed by a constant switching factor.

To summarize, typical tamper responses to destroy sensitive data trigger off of penetration sensing and temperature/voltage sensing limits, and respond with power removal to SRAM memory to destroy sensitive data. As previously discussed, the quality and time required of this data erasure response can be influenced by temperature and voltage extremes. This invention offers better protection from breaches of the secure enclosure when temperature and voltage extremes (attacks) are used to preserve data retention (time) than only power removal (or grounding of the power terminal) to the memory device.

SUMMARY OF THE INVENTION

The shortcomings of the prior art are overcome and additional advantages are provided through the provision of encrypting the sensitive data in secure storage volatile memory with a master key. This master key becomes the data that can be more confidently destroyed upon a tamper event. Since the amount of sensitive data has been reduced to the master key, active erasure can be used to provide faster more complete data removal within the tamper response window, and constant inverting of master key data can be easily implemented to reduce exposure to data imprinting in storage memory. As an added measure, power removal (grounding of the power terminal or reversing polarity of the power terminal) to the memory containing the encrypted secure data is also done upon a tamper event. System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings. As a result of the summarized invention, technically we have achieved a solution which provides better security of data that needs to be protected, more rapid and sure removal of data to be protected upon a tamper event, and better immunity to temperature and voltage influences (attacks) that can impair the removal of data to be protected.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
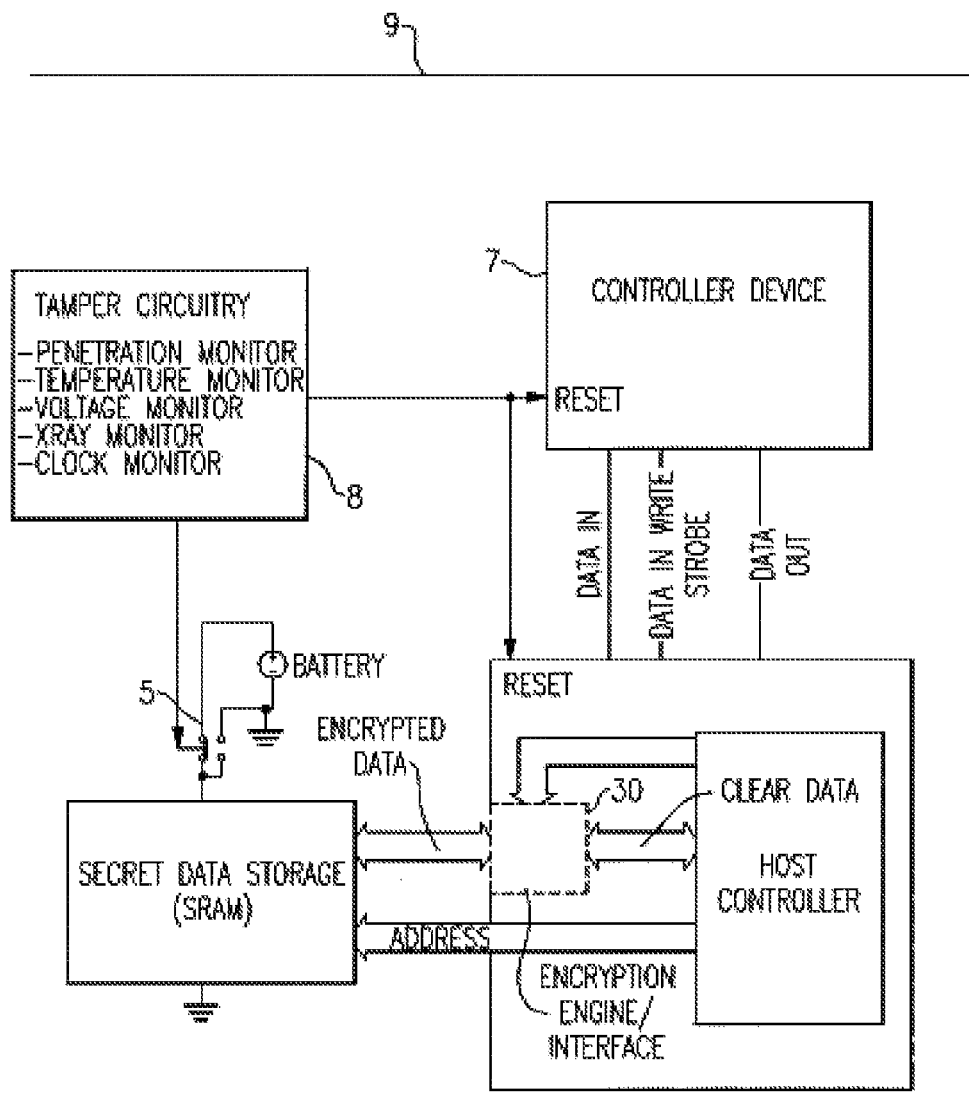
FIG. 1 is a block diagram of the present invention integrated inside of a physically secure data system.
Figure 3:
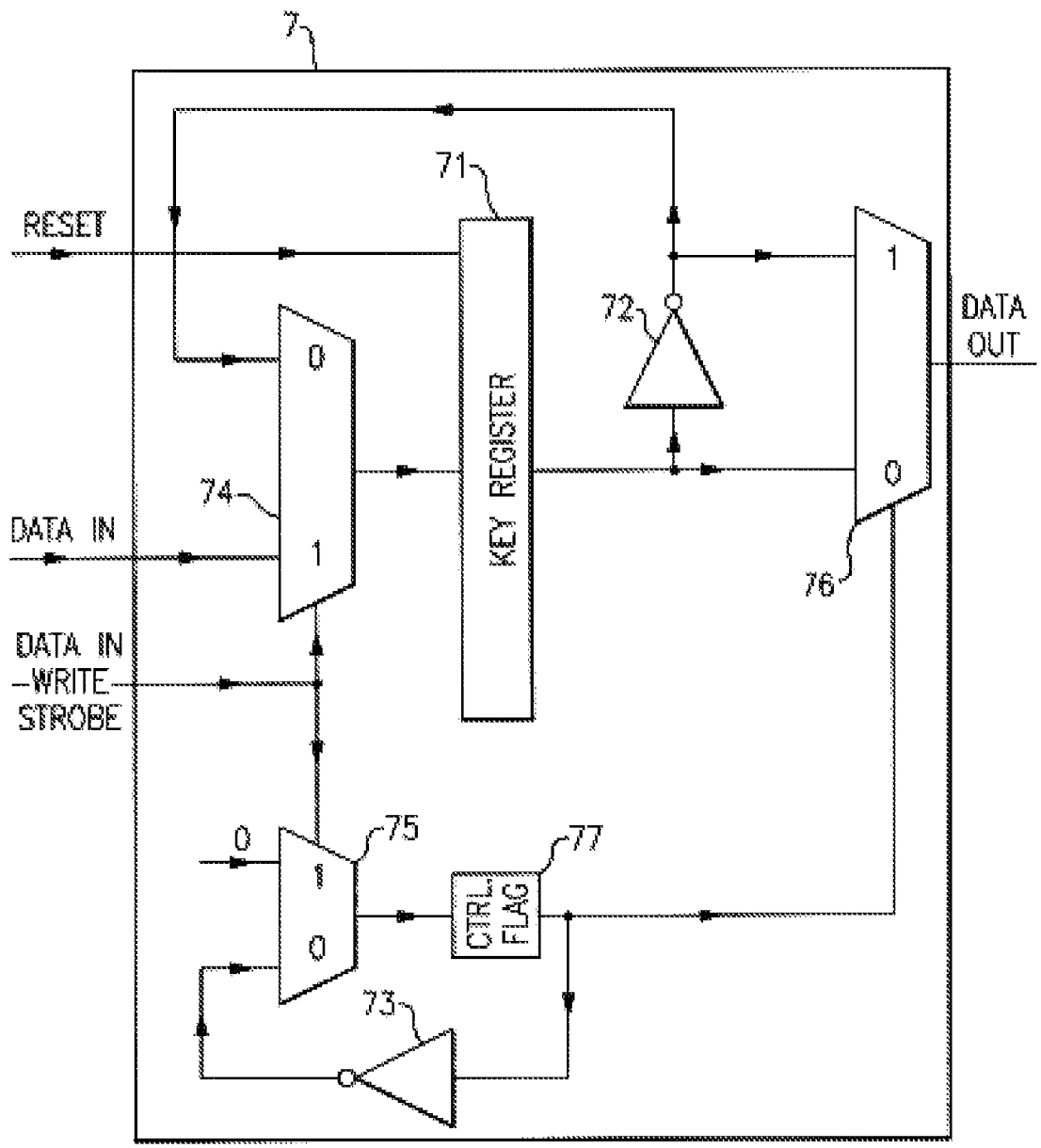
FIG. 3 illustrates an embodiment of the critical master key register with non-static storage.

Turning now to the drawings in greater detail, it will be seen that FIG. 1 is directed to a memory system or security module 9 in accordance with the present invention which is operated within an electronically secure environment having a plurality of sensors designed to detect various forms of tampering as well as fluctuations in temperature, x-ray, voltage, and power fluctuations. Module 9 is thus located within this secure tamper respondent system. This module 9 provides the encryption of data secrets, active erasure upon a tamper event of the key(s) used to encrypt data secrets, and periodic inverting of the key(s) data used to encrypt data secrets. The system 9 includes a controller device 7 having a master key storage register 71 connected to an inverter 72 which periodically inverts or toggles the master key storage register 71. A more detailed illustration of the controller device is shown in FIG. 3. The system 9 may use either a software or hardware encryption engine or interface 30 to perform and control the encryption and decryption of data in the secure storage memory 4. A tamper subsystem 8 is used to control a power supply 5 (which may include a battery) to the controller device 7 and secret storage memory 4. The tamper subsystem 8 is connected to the controller device 7 to control the reset input to the master key storage 71, and host controller 2 for internal initialization to generate and store the master key. The tamper subsystem 8 includes several monitors that receive signals from temperature sensors, voltage sensors, physical penetration sensors, and other environmental and electrical sensors not shown. The tamper subsystem 8 also includes management logic that will amongst other things reset the master key storage 71, remove, shunt to ground or reverse polarity power to the secret storage memory 4 and controller device 7 containing the master key 71 based on information from the tamper subsystem monitor circuits(s).

In operation, the master key storage 71 is generated at system initialization and loaded into a special secure storage area that could be a low power CPLD or microcontroller. The characteristic of the data register location within the master key is stored such that it can be globally reset with one simple input signal. This master key is used to encrypt/decrypt sensitive data such as cryptographic keys when the data is stored or retrieved from the secure memory. The secure memory storage 4 maybe implemented in a volatile memory such as SRAM. The encryption is done rapidly in a hardware encryption engine 30 or via software when the sensitive data is loaded, or decrypted when retrieved and needed. A typical software implementation of the encryption interlace consists in the host controller 2 reading the proper encryption key from master key storage 71 and encrypting/decrypting the data traffic to/from the secret data storage 4. The hardware implementation of the same interface relies on a hardware encryption engine or interface 30 integrated with the memory controller used to interface the secret data storage 4.

Figure 2:
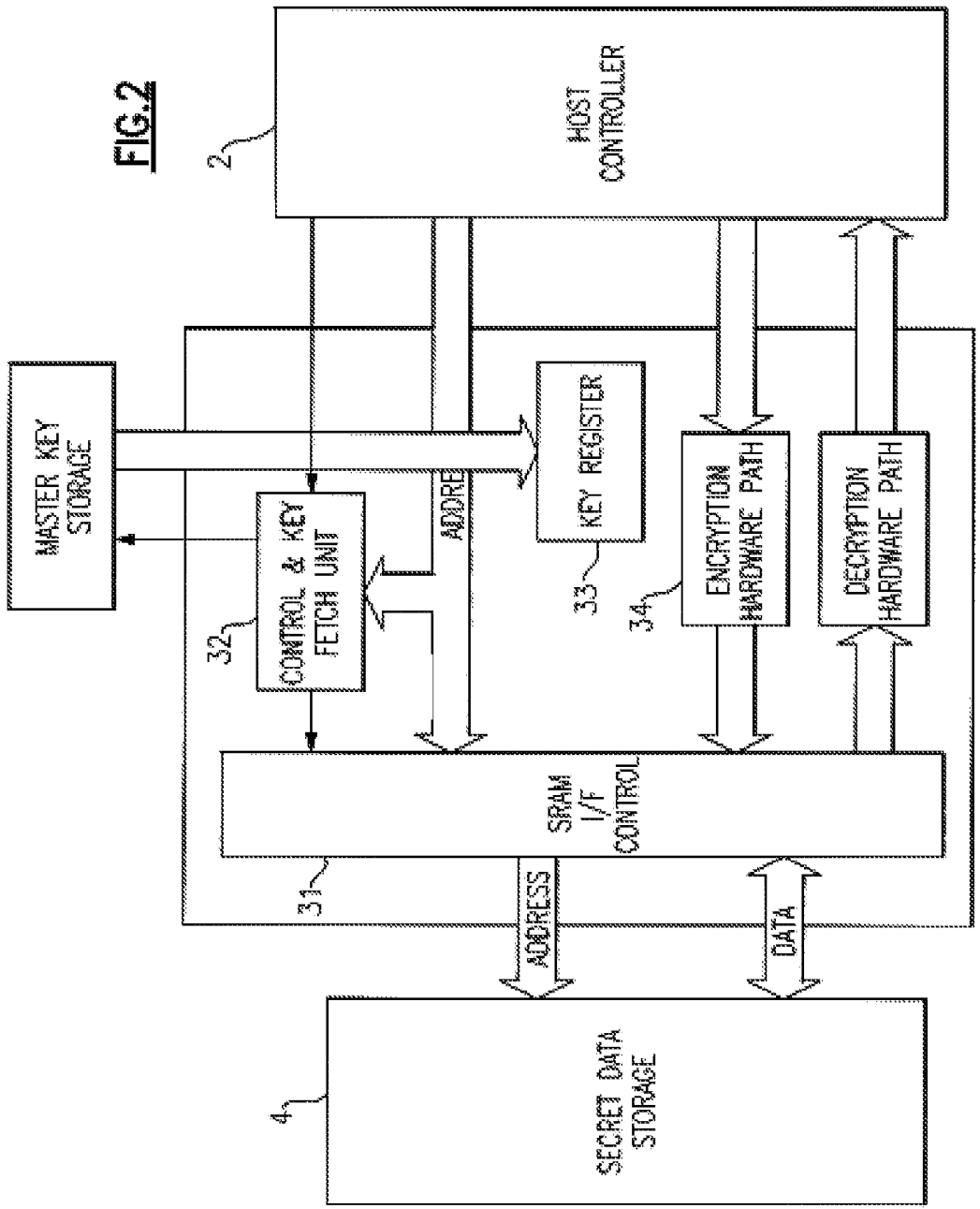
FIG. 2 illustrates the data flow of the present invention.

An embodiment is depicted in FIG. 2 in which a write transaction issued by the host controller 2 is filtered by the encryption engine interface 30. The data to be written is latched at the input of the encryption hardware path 34 while the control & key fetch unit 32 read from the master key storage 71 and the appropriate key that is written to crypto engine key register 33. Once the proper key is loaded in the key register 33 the data is encrypted and moves through the SRAM I/F controller 31 to the secret data storage 4. In a similar way a host controller 2 read request is intercepted by the control & key fetch unit 32 that load the key register 33 with the appropriate key from the Master Key Storage 71 and at the same time perform a data read from the secret data storage 4 The data read from the secret data storage 4 is passed through the SRAM I/F controller 31 and subsequently provided in input to the decryption hardware path 35. The decrypted data is then returned to the host controller 2.

When a tamper event occurs the response is to immediately reset the master key data registers, thereby actively destroying the master key, and then remove power (ground the power terminal of the device storing the master key) from the master key storage area as well as removing power to the encrypted sensitive/secure data storage (SRAM) device. Since the sensitive data at rest in the volatile SRAM memory is encrypted, the data is protected from unauthorized access even if the data in the SRAM is recovered due to increased data retention time at low temperature or 'burned in states'. Only the master key needs to be reliably destroyed on the tamper response. The exposure of possibly retaining data with power removal that is sensitive to temperature or voltage is reduced by being able to actively erase the master key and constant inversion of the master key at 50% duty cycle. Active reset of the master key protects against low temperature attacks that could retain data longer upon power removal and offer an opportunity to lengthen the time window of attack. Further, the master key data bits are continuously inverted at a 50% duty cycle (changing a 2 state element from 1 state to the other) to prevent imprinting of a preferred state in the master key storage elements.

FIG. 3 illustrates an implementation of a master key storage register integrated with data flipping logic. The key register 71 is loaded from the DATA IN input on the rising edge of the write clock if the data in write strobe is active. The same condition is also used to set the control flag (Ctrl. Flag) 77 to zero indicating that the contents of the key register 71 is being written and contains valid data. The value in the key register 71 and the control flag 77 is inverted through the inverters 72 and 73 (respectively) and written back into the key register 33 and control flag 77 at every write clock when the DATA IN write strobe is inactive. The DATA OUT is driven by the multiplexer 76 that outputs the data stored in the key register 71 when the control flag 77 is equal to 0 or the inverse of the data stored in the key storage 71 generated by inverter 72.

This action provides protection from a high temperature or high voltage attack that could set the storage elements to a preferred state on power up and reveal the master key. The removal of power to the secret data storage area offers an additional layer of protection that can be considered when determining the strength of the encryption mode to be used.

The capabilities of the present invention can be implemented in software, firmware, hardware or some combination thereof.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the fixture, may make various improvements and enhancements which fall within the scope of the claims which follow. These claims should be construed to maintain the proper protection for the invention first described.

What is claimed is:

1. A master key device which protects secret information stored in an electronic secret storage memory comprising:
   a controller device for a security module operated within an electronically secure environment having a plurality of sensors designed to detect various forms of tampering as well as fluctuations in temperature, x-ray, voltage, and power fluctuations located within a secure tamper respondent system, which security module provides the encryption of data secrets,
   said controller device being coupled to a tamper detection subsystem used to control a power supply for said controller device and secret storage memory and used to control a reset input to a master key storage, and to a host controller for to generate and store a master key, said tamper detection subsystem also including management logic to reset the master key storage, and remove, shunt to ground or reverse polarity power to the secret storage memory and controller device containing said master key based on information from said tamper detection subsystem,
   said controller device having a master key storage with a master key storage register connected to an inverter which periodically inverts or toggles the master key storage register to periodically invert keys stored in said master key storage register, and used to perform and control the encryption and decryption of data in the secret storage memory, said master key storage register providing an encryption key storage with a data register located in said master key storage register having an encryption key used to encrypt the sensitive data in said secret storage memory such that said master key becomes the critical sensitive data that can be destroyed upon a tamper event without having to immediately destroy all encrypted data secrets, the encryption key storage having a reset input;
   an inverter which continuously inverts the encryption key in the storage register; and
   a tamper respondent device which provides an output signal to the reset input of the encryption key storage upon start up and upon a tamper event to destroy the encryption key with a tamper event output signal reset signal from said tamper detection subsystem to said encryption key storage reset input such that said critical sensitive data of said master key is erased and cannot function, preventing access to the data secrets.

2. The master key device of claim 1 in which the master key storage is a volatile memory.

3. The master key device of claim 2 in which the volatile memory is an SRAM.

4. The master key device of claim 3 that includes a power supply which supports the master key storage register storage and is turned off upon receiving a tamper event output signal in order to erase said critical sensitive data of said master key.

5. The master key device of claim 1 in which the inverter operates at a 50% or more duty cycle to prevent imprinting a preferred state in the encryption key.

6. The master key device of claim 1 which includes an encryption interface controlled by the encryption key to encrypt and decrypt the data secrets.

7. The master key device of claim 6 wherein the encryption interface includes a fetch circuit which reads the encryption key storage and writes it to a key register so that the secret information may be encrypted and decrypted to a memory controller and read in and out of the secret storage memory.

8. The master key device of claim 1 wherein a host controller reads the encryption key and encrypts and decrypts the secret information exchanged between the host controller and the secret storage memory.

9. A tamper resistant system for protecting secret data stored in secret storage memory comprising:
   a secret data secure storage memory;
   a controller device for a security module operated within an electronically secure environment having a plurality of sensors designed to detect various forms of tampering as well as fluctuations in temperature, x-ray, voltage, and power fluctuations located within a secure tamper respondent system, which security module provides the encryption of data secrets,
   said controller device being coupled to a tamper detection subsystem used to control a power supply for said controller device and secret storage memory and used to control a reset input to a master key storage, and to a host controller for to generate and store a master key, said tamper detection subsystem also including management logic to reset the master key storage, and remove, shunt to ground or reverse polarity power to the secret storage memory and controller device containing said master key based on information from said tamper detection subsystem,
   said controller device having a master key storage with a master key storage register connected to an inverter which periodically inverts or toggles the master key storage register to periodically invert keys stored in said master key storage register, and used to perform and control the encryption and decryption of data in the secret storage memory, said master key storage register providing an encryption key storage with a data register located in said master key storage register having an encryption key used to encrypt the sensitive data in said secret storage memory such that said master key becomes the critical sensitive data that can be destroyed upon a tamper event without having to immediately destroy all encrypted data secrets, the encryption key storage having a reset input;

an inverter which continuously inverts the encryption key in the storage register; and a tamper respondent device which provides an output signal to the reset input of the encryption key storage upon start up and upon a tamper event to destroy the encryption key with a tamper event output signal reset signal from said tamper detection subsystem to said encryption key storage reset input such that said critical sensitive data of said master key is erased and cannot function, preventing access to the data secrets.

10. The tamper resistant system of claim 9 in which the master key storage is a volatile memory.

11. The tamper resistant system of claim 10 in which the volatile memory is an SRAM.

12. The tamper resistant system of claim 11 further having a self contained power system to support the SRAM.

13. The tamper resistant system of claim 12 wherein the power system is shut off upon receiving the output signal from a tamper event to destroy all information stored in the master key storage register.

14. A method to protect secret information stored in an electronic secret storage memory, comprising the steps of:

providing a controller device for a security module operated within an electronically secure environment having a plurality of sensors designed to detect various forms of tampering as well as fluctuations in temperature, x-ray, voltage, and power fluctuations located within a secure tamper respondent system, which security module provides the encryption of data secrets, said controller device being coupled to a tamper detection subsystem used to control a power supply for said controller device and secret storage memory and used to control a reset input to a master key storage, and to a host controller for to generate and store a master key, said tamper detection subsystem also including management logic to reset the master key storage, and remove, shunt to ground or reverse polarity power to the secret storage memory and controller device containing said master key based on information from said tamper detection subsystem, said controller device having a master key storage with a master key storage register connected to an inverter which periodically inverts or toggles the master key storage register to periodically invert keys stored in said master key storage register, and used to perform and control the encryption and decryption of data in the secret storage memory, said master key storage register providing an encryption key storage with a data register located in said master key storage register having an encryption key used to encrypt the sensitive data in said secret storage memory such that said master key becomes the critical sensitive data that can be destroyed upon a tamper event without having to immediately destroy all encrypted data secrets, the encryption key storage having a reset input; and an inverter which continuously inverts the encryption key in the storage register; and a tamper respondent device which provides an output signal to the reset input of the encryption key storage upon start up and upon a tamper event to destroy the encryption key with a tamper event output signal reset signal from said tamper detection subsystem to said encryption key storage reset input such that said critical sensitive data of said master key is erased and cannot function, preventing access to the data secrets; and loading an encryption key into the encryption key storage to access the electronic secret storage memory;

continuously inverting the encryption key in the encryption key storage;

encrypting and decrypting the secret information in the electronic secret storage memory using the encryption key; and destroying the encryption key when the tamper event signal is received by the encryption key storage when a tamper event output signal reset signal is sent to said encryption key storage reset input such that said critical sensitive data of said master key is erased and cannot function, preventing access to the secret information stored in said electronic secret storage memory.

15. The method of claim 14 in which the master key storage is a volatile memory.

16. The method of claim 15 in which the volatile memory is an SRAM.

17. The method of claim 16 which includes supplying power to the electronic secret storage memory that is turned off upon receiving a tamper event output signal in order to erase the encryption key in the master key storage register protecting said data secrets.

18. The method of claim 14 in which the inverting operates at a 50% or more duty cycle to prevent imprinting a preferred state in the encryption key.

19. The method of claim 18 which includes reading the key storage and writing it to a key register so that the secret information may be encrypted and decrypted to a memory controller and read in and read out of the secret storage memory.

20. The method of claim 14 which includes a host controller that reads the encryption key and encrypts and decrypts the secret information exchanged between the host controller and the secret storage memory.

* * * * *